United States Patent Office 3,553,115
Patented Jan. 5, 1971

3,553,115
RUBBER MIXTURES
Jean Curchod, Paris, and Roland Cheritat, Le Perreux-sur-Marne, France, and Franz Rudolf Widmer and Gustav Widmer, Basel, Alfred Renner Muenchenstein, and Hans Batzer, Arlesheim, Switzerland, assignors to Ciba Limited, Basel, Switzerland, a company of Switzerland
No Drawing. Continuation-in-part of application Ser. No. 389,197, Aug. 12, 1964. This application Nov. 14, 1968, Ser. No. 775,964
Int. Cl. C08b 37/22
U.S. Cl. 260—3                                    4 Claims

ABSTRACT OF THE DISCLOSURE

Light-colored, technically valuable vulcanisates are obtained according to the invention when natural or synthetic rubber is vulcanised in the presence of insoluble and infusible, finely dispersed aminoplasts having an inner surface of more than 10 square meters per gram and an average particle size smaller than $5\mu$.

---

This application is a continuation-in-part application of our copending application Ser. No. 389,197, filed Aug. 12, 1964, now abandoned.

Vulcanisates from natural rubber or synthetic elastomers are manufactured by dispersing in the crude mixtures finely divided solid substances that interact with the molecules of the polymer and thereby determine to a large extent the physical properties of the finished vulcanisate. Since certain of these insoluble and infusible solid substances improve the technical properties of the final products, they are also referred to as active or reinforcing fillers.

The rubber industry makes preferred use of carbon black as filler and uses it on a very large scale. However, apart from its good reinforcing properties carbon black has the great disadvantage that it is black so that it is excluded from many uses. In recent times a number of further, predominantly inorganic, solid substances have been adopted, generally called "white fillers" for short, such as silicic acid, silica gel, aluminum silicates, calcium silicates, alumina gel, calcium carbonate, China clay, chalk, ground mica, illite, gypsum, zinc oxide and magnesium oxide. These substances have a relatively high specific gravity which is undesirable for some structural purposes. In addition, many of them produce only a minor reinforcing effect and even the most active in this group of white fillers do not reach the reinforcing action produced by good types of carbon black.

Now there has been found a process for making a new type of finely dispersed, insoluble and infusible aminoplast fillers and vehicles having a specific surface area greater than 10 square meters per gram. For example a solid phase is formed from an aqueous solution of melamine and formaldehyde at a molecular ratio of from 1:1.5 to 1:6 at a temperature from 20° to 100° C. and at a pH value from 6 to 0, this phase is then freed at least largely from inorganic salts, then freed from water at a temperature between 30° and 160° C. and comminuted to an average particle size smaller than $5\mu$.

In the conventional processes for the manufacture of condensation products from melamine and formaldehyde it is usual to ensure by suitable measures—for example by discontinuing the resinification reaction before term or by reacting the components within a pH range from 6 to 10—that products are obtained which are soluble or insoluble, or at least still fusible, so that they can be cured in a follow-up stage. In contradistinction thereto the insoluble, infusible aminoplast fillers are fully crosslinked resins that can no longer be shaped and at the same time cured.

Surprisingly, it has been found that light-colored, technically voluable vulcanisates are obtained according to the invention when natural or synthetic rubber is vulcanised in the presence of insoluble and infusible, finely dispersed aminoplasts having an inner surface of more than 10 square meters per gram and an average particle size smaller than $5\mu$.

The present invention does not include the preparation of the finely divided aminoplasts.

In the following description and in the patent claims the term "amino-aldehyde resin" or "aminoplast" respectively has the well-accepted meaning in the art. In particular, it comprises the condensation products of aldehydes, especially formaldehyde, optionally in conjunction with other aldehydes such as acetaldehyde or acrolein, with aminoplast formers such as urea, thiourea, guanidine, dicyandiamide, acrylamide, aniline and aminotriazines, especially melamine, and ethylene urea.

Apart from melamine the foremost amino-triazine components are guanamines such as formoguanamine, acetoguanamine, lauroguanamine, $\Delta^3$ - tetrahydrobenzoguanamine, hexahydrobenzoguanamine and benzoguanamine.

Radicals containing hydroxyl groups, present in the amino-aldehyde resins, such as methyol groups, may also be wholly or partially etherified with methanol, ethanol, n-propanol, isopropanol, n-butanol, isobutanol, allyl alcohol, methallyl alcohol or 2-buten-1-ol.

The aminoplast resins to be used according to the invention may also contain modifying additives or they may have been sulfurated. Such additives are phenol, cresols, xylenols, especially in the form of precondensates based on formaldehyde and phenol, cresol or xylenol, and the methylol compounds or novolaks of a higher degree of condensation may be added at any desired condensation stage. Further suitable additives are aniline and alkylanilines and their formaldehyde resins, carboxylic acid amides such as acetamide, hexamethylenetetramine, ethyleneimino polymers and natural resins, such as colophony or copal resin. The sulfurization is generally performed by adding sulfur or sulfur donors, such as hydrogen sulfide, di-sulfur dichloride, ammonium sulfide or polysulfides. The sulfur content thus achieved may have a favourable influence on the vulcanisation and improves the formation of main valencies between filler and rubber. By incorporating mercaptans at the methylol groups of the nitrogenous resin component it is possible to achieve at the same time an acceleration of the vulcanisation, for example by the known addition reaction of mercapto-benzthiazole with the methylolmelamines.

In a preferred variant of the present process there are used resins which are cured or condensed respectively in the presence of surface-active substances of the nonionic or ionic kind, for example nonionic polyalkylene ethers or natural products, such as tragacanth, gum arabic, anionic fatty alcohol sulfonates, alkylaryl sulfonates, isomerized abietic acid, salts of sulfonsuccinic acid esters, or cationic quaternary ammonium bases. The latter are of advantage, for example, when a particularly good compatibility with the generally negatively charged latex particles is aimed at.

The cured, finely dispersed aminoplasts can be incorporated in the rubber on a roller mill or they may be admixed with the latex.

The amount of aminoplast powder to be added may vary 1% to 80% referred to the weight of the mixture as a whole; a preferred proportion is 5% to 35%.

The term rubber as used in the present specification and in the patent claims has the wide meaning generally used in the rubber industry which includes both the olefin elastomers and the rubber-like polycondensates and polyadducts. Apart from natural rubber and its derivatives, such as chlorinated rubber, cyclo rubber and cationically treated latex there may be mentioned above all the polymers and copolymers of butadiene, isoprene and chloroprene, such as normal, atactic polybutadiene, syndiotactic and isotactic 1,2-polybutadiene, cis-1,4-polybutadiene, trans-1,4-polybutadiene, poly-2,3-dimethylbutadiene, cis-1,4-polyisoprene, butyl rubber, chlorinated butyl rubber, copolymers from butadiene and styrene or methylstyrene, acryonitrile, 2 - methyl-5-vinylpyridine, vinylpyridine, methacrylate, acrylates, dialkylacrylic acid amides and nuclear-halogenated styrenes. To this class belong also chlorinated and sulfochlorinated polyethylene, copolymers of vinylchloride with ethylene, vinylidene-fluororide copolymers with trifluoroethylene or hexafluoropropylene, ethylene-butene-1 and ethylene-propylene copolymers such as ethylene-propylene terpolymers with dicyclopentadiene, 1,4-hexadiene, 2-methylene-norbornadiene and the like as the tertiary component; silicone rubber, fluorinated silicone rubbers, urethane rubbers, tetrafluoroethylene-trifluoronitrosomethane copolymers, thiocol rubber and polyphosphorus nitrile chloride and its derivatives in which the chlorine atoms are replaced by alkyl, aryl, alkoxy or aryloxy groups, as well as their mixtures or copolymers.

Apart from the additives of finely dispersed aminoplast filler according to this invention the mixtures to be vulcanised may contain any of the usual rubber additives and compounding substances, that is to say that, apart from vulcanising agents including actinic and corpuscular irradiation, there may be added accelerators, activators, decelerators, antioxidants and heat stabilizers, glues and other white fillers. Furthermore, there may be added dyestuffs and pigment colors. The mixtures may also contain inorganic oxides or thermoplastic resins such as polyvinylchloride and epoxy resins as compounding substances.

By virtue of their light colors the vulcanisable mixtures of the invention may be used with special advantage wherever the black color of carbon black is unacceptable, for example in the manufacture of white or light-colored rubber articles in industry and the home, such as rubber goods for the household, sundries, toys, industrial rubber goods and sidewalls of automobile tires.

By comparative tests it can be shown that the use according to the invention of a finely dispersed aminoplast as filler leads to light-colored vulcanisable rubber having mechanical strength properties that are certainly equal to those obtained with good types of carbon black. In addition, rubber vulcanisates containing aminoplast resins, for example melamine-formaldehyde resins, according to the invention, in the same proportions as a comparable vulcanisate containing an inorganic white filler, have a lower specific gravity.

Unless otherwise indicated, parts and percentages in the following examples are by weight. The relationship between parts by volume and parts by weight is the same as that between the milliliter and the gram.

The rubber mixes used in the example were prepared with the following aminoplasts:

Manufacture of insoluble aminoplasts having a large inner surface.

AMINOPLAST A

A mixture of 126 parts of melamine and 200 parts of a 30% aqueous solution of formaldehyde (which had first been adjusted to pH=8.5 with 0.9 part by volume of N-sodium hydroxide solution) is heated to 85° C., with the melamine passing into solution. This solution is diluted by tipping in a mixture, heated to 94° C., of 84 parts of a 6% aqueous tragacanth solution and 4000 parts of water. Within 3 to 10 minutes 100 parts by volume of 10% sulfuric acid are vigorously stirred in, whereupon a white precipitate forms. The whole is allowed to cool to 50° C. and the mixture, which has a pH of 4.45, is then filtered. The filter radical is washed copiously with water, until sulfate ions can no longer be detected in the filtrate. The moist filter cake is subjected to azeotropic distillation until no more water separates, whereupon the bulk of benzene is filtered off. The white, pulverulent resin is freed from benzene in a drying cabinet at 80° C. until its weight remains constant and then ground for 4 hours in a porcelain ball mill, to yield 151 parts of a white powder which passes through a sieve having an inner mash size of 0.1 mm., has a bulk weight of 11.5 g. per 100 ml. and a specific surface area of 76 square meters per gram.

The following aminoplasts are manufactured in an identical manner:

TABLE 1

| | Melamine, mol | Modifier mol used | 30% aqueous formaldehyde solution, mols | Yield per mol of amide components, grams | Bulk weight, g./100 ml. | Spec. surface area, m.²/g. |
|---|---|---|---|---|---|---|
| Aminoplast: | | | | | | |
| B | 1 | Nil [1] | [2] 4 | 170 | 12 | 53 |
| C | 1 | Nil | [2] 6 | 172 | 13 | 65 |
| D | 0.9 | Acrylic acid amide, 0.1 | 2 | 150 | 15 | 32.5 |
| E | 0.7 | Ammonium disulfide,[3] 0.3 | 2 | 114 | 18 | 29 |

[1] Instead of 100, 20 parts by volume of sulfuric acid are used.
[2] The formaldehyde solution was adjusted to pH 6.0 with sodium hydroxide solution.
[3] In this case the amount of ammonium disulfide used corresponds to 0.3 gram atom of sulfur.

AMINOPLAST F

A mixture of 4 parts of a 50% aqueous solution of monobasic monoethanolamine phosphate and 400 parts of 30% aqueous formaldehyde solution is adjusted with 13.5 parts by volume of N-sodium hydroxide solution to pH 6.00. The mixture is heated with 126 parts of melamine to 60° C. After 15 minutes a clear, colorless solution has formed. To maintain the temperature at 60° C., moderate cooling is required. 30 minutes after addition of the melamine, the melamine-formaldehyde precondensate has a pH value of 6.71 at 60° C. The batch is cooled to 20° C., whereupon the solution has a pH of 6.85, diluted with a solution of 18.2 parts of a 25% aqueous solution of a nonionic dispersant marketed under the registered trademark "Emulphor O" (obtained by condensing a higher fatty alcohol with ethylene oxide) and with 108 parts of a 50% aqueous solution of monobasic monoethanolamine phosphate in 262 parts of water. The mixture is adjusted with 127 parts by volume of dilute hydrochloric acid (1 part by volume of concentrated hydrochloric acid to 1 part of water) to a pH of 2.70, heated for 6 hours at 45° C.; the resulting, firm, white gel is then comminuted with a stirrer with 1100 parts of water and 138 parts by volume of concentrated ammonia until it forms a white paste having a pH value of 8.0. The whole is kept for 10 hours at room temperature, filtered and washed with water until chlorine ions can no longer be detected in the filtrate. The moist filter cake is subjected to azeotropic distillation with benzene until water no longer separates, whereupon the bulk of the benzene is filtered off. The white, pulverulent resin is freed from benzene in a drying cabinet at 80° C. until its weight remains constant, to yield 191 parts of a white powder which is ground for 4 hours in a porcelain ball mill. The resulting ground material passes through a sieve having an inner mesh size of 0.1 mm. It has a bulk weight of 19 g. per 100 ml. and a specific surface area of 260 m.$^2$/g.

The following aminoplasts were manufactured in a similar manner:

heated for 6 hours at 45° C. and the aminoplast formed is isolated as has been described for aminoplast F. Yield: 202 parts of a white powder which has a bulk weight of 10 g./100 ml. and a specific surface area of 174 m.$^2$/gram.

AMINOPLAST R 60 parts of urea are dissolved at room temperature in 200 parts of an aqueous 30% formaldehyde solution, then diluted with 31.4 parts of a 25% aqueous solution of the dispersant "Emulphor O" (used above for manufacturing aminoplast F), 109.5 parts of a 50% aqueous solution of monobasic monoethanolamine phosphate and 238 parts of water, and then adjusted with 85.6 parts by

TABLE 2

| Aminoplast: | Melamine, mol | Modifier used, mol | 30% aqueous formaldehyde solution, mols | Yield per mol of amide components, grams | Bulk weight, g./100 ml. | Spec. surface area, m.$^2$/g |
|---|---|---|---|---|---|---|
| G | 0.97 | Acrylamide, 0.03 | 4 | 207 | 13 | 129 |
| H | 0.97 | Ammonium disulfide [1] 0.03 | 4 | 174 | 14 | 436 |
| J | 1 | Allyl alcohol, 1.0 | 4 | 212 | 12 | 201 |
| K | 0.7 | Thiourea, 0.3 | 3.4 | 145 | 10 | 218 |
| L | 0.97 | Monoamide from linoleic acid and diethylenetriamine,[2] 0.03 | 4 | 198 | 11 | 329 |
| M | 0.9 | Monoamide from linoleic acid and diethylenetriamine,[2] 0.03 | 4 | 199 | 11 | 252 |
| N | 0.7 | Lauroguanamine, 0.3 | 4 | 209 | 13 | 60.6 |
| O | 0.7 | Urea, 0.3 | 3.2 | 149 | 24 | 262 |

[1] In this case the amount of ammonium disulfide used corresponds to 0.03 gram atom of sulfur.
[2] Obtained by reacting 1 mol of linoleic acid with 1 mol of diethylenetriamine at 200° C., accompanied by elimination of water.

AMINOPLAST P 200 parts of 30% aqueous formaldehyde solution and 2 parts of a 50% aqueous solution of monobasic monoethanolamine phosphate are adjusted with 11 parts by volume of N-sodium hydroxide solution to pH 8.00. The whole is mixed with 126 parts of melamine and heated for 1 hour at 70° C. The resulting clear solution is cooled to 20° C. and then diluted with 28.6 parts of a 25% aqueous solution of the dispersant "Emulphor O" (used above for the manufacture of aminoplast F), with 181 parts of a 50% aqueous solution of monobasic monoethanolamine phosphate and with 590 parts of water. The batch is adjusted with 111 parts by volume of concentrated hydrochloric acid to pH 2.22, then heated for 6 hours at 45° C. and the aminoplast formed is isolated as described for aminoplast F, to yield 142 parts of a white powder which has a bulk weight of 10 grams per 100 ml. and a specific surface area of 177 m.$^2$/g.

AMINOPLAST Q 600 parts of 30% aqueous formaldehyde solution and 3 parts of a 50% aqueous solution of monobasic monoethanolamine phosphate are adjusted with 14.8 parts by volume of N-sodium hydroxide solution at pH 6.5. The whole is heated with 126 parts of melamine for 30 minutes at 50° C., and the resulting clear, colorless solution of the precondensate is cooled to 20° C.; this solution is diluted with 600 parts of water, 26.7 parts of an aqueous 25% solution of the dispersant "Emulphor O" (used above for the manufacture of aminoplast F) and 238 parts of an aqueous 50% solution of monobasic monoethanolamine phosphate. The batch is adjusted with 62 parts by volume of dilute hydrochloric acid (1 part by volume of concentrated hydrochloric acid to 1 part of water) to a pH value of 4.5. The batch is then volume of dilute hydrochloric acid (1 part by volume of concentrated hydrochloric acid to 1 part of water) at 20° C. to a pH value of 1.0. The batch is heated for 6 hours at 45° C. and the aminoplast thus formed is isolated as described for aminoplast F. Yield: 49 parts of a white powder which has a bulk weight of 11.5 g./100 ml. and a specific surface area of 73 m.$^2$/gram.

The rebound resilience values shown in the following examples were determined with the aid of the test gear of the Institut Français du Caoutchouc (makers: Mécanique Industrielle d'Enghien) whose pendulum has an energy content of 5 cm. kg. (at 90° amplitude) and strikes from an amplitude of 90° two discs of 4.5 mm. thickness and 44.6 mm. diameter placed one on top of the other. The rebound of the pendulum is expressed in percent of the recovered energy content. In the static test to determine the hysteresis and resilience the test piece is made to French Standard Specification NFT 43–002 as a ring having an external diameter of 52.6±0.2 mm., an internal diameter of 44.6±0.2 mm. and 4.5 mm. thickness. The relevant tensile stress test is performed according to French Standard Specification NFT 46–002, the stress-strain diagram being plotted to a stretch of 300%. From the area of the hysteresis loop the hysteresis is computed in the known manner. According to definition the resilience is 100-hysteresis (in percent).

EXAMPLE 1

Vulcanising natural rubber in the presence of aminoplasts

A 2-roll mill is used for preparing a mixture from 100 parts of natural rubber, 2 parts of stearic acid, 5 parts of zinc oxide, 30 parts of one of the finely divided aminoplasts described above, 3 parts of diethylene-glycol, 2 parts of the plasticiser marketed by Messrs. Sun Oil Co. under the registered trademark "Circolight Process Oil" (a naphthenic petroleum fraction having a flash point of 165° C. and containing 19% of aromatic carbon atoms, 40% of naphthenic carbon atoms and 41% of paraffinic carbon atoms), 2.3 parts of sulfur, 0.8 part of the vulcanisation accelerator marketed by Messrs. Monsanto under the registered trademark "Santocure" (consisting of N-cyclohexyl-2-benzothiazolesulfenamide) and 0.3 part of zinc diethyl dithiocarbamate. The light-colored, homogeneous test pieces obtained by vulcanisation at 143° C. revealed the following properties:

After vulcanisation for 15 minutes at 150° C., the test pieces revealed the following optimum properties:

Tensile strength—120 kg./cm.$^2$
Modulus at 300% elongation—115 kg./cm.$^2$
Ultimate elongation—325%
Shore hardness A—74
Tear strength—38 kg./cm.
Rebound resilience—45%
Abrasion—685 cu. cm./H.P./hr.

TABLE 3

| | Aminoplast used | | | | | | | | | | | | | | | |
|---|---|---|---|---|---|---|---|---|---|---|---|---|---|---|---|---|
| | A | B | C | D | E | F | G | H | J | K | M | N | O | P | Q | R |
| Vulcanisation time, minutes | 10 | 15 | 15 | 10 | 5 | 25 | 20 | 15 | 10 | 10 | 10 | 15 | 20 | 15 | 15 | 15 |
| Tensile strength, ASTM D412, kg./cm.$^2$ | 292 | 238 | 221 | 268 | 268 | 198 | 210 | 170 | 220 | 202 | 252 | 221 | 106 | 279 | 253 | 240 |
| Modulus at 300% stretch ASTM D412, kg./cm | 110 | 104 | 116 | 106 | 111 | 106 | 120 | 132 | 124 | 147 | 141 | 95 | 73 | 139 | 156 | 117 |
| Ultimate stretch, ASTM D412, percent | 550 | 505 | 440 | 565 | 530 | 470 | 410 | 330 | 460 | 400 | 430 | 520 | 405 | 495 | 445 | 500 |
| Shore hardness A | 56 | 60 | 58 | 58 | 58 | 54 | 58 | 63 | 55 | 59 | 64 | 61 | 52 | 67 | 66 | 71 |
| Tear strength, ASTM D624, test piece A, kg./cm | 118 | 100 | | | | 40 | | | 107 | | | | | 121 | 131 | 98 |
| Rebound resilience, percent | 56 | 50 | | | | 52 | | | 52 | | | | 53 | 57 | 52 | 51 |
| Static test: | | | | | | | | | | | | | | | | |
| 1st cycle: | | | | | | | | | | | | | | | | |
| Hysteresis, percent | 60 | 61.3 | | | | 70.5 | | | 70.2 | | | | | 69.3 | 68.6 | |
| Resilience, percent | 40 | 38.7 | | | | 29.5 | | | 29.8 | | | | | 30.7 | 31.4 | |
| 10th cycle: | | | | | | | | | | | | | | | | |
| hysteresis, percent | 31.5 | 54.3 | | | | 40.5 | | | 34.6 | | | | | 36.6 | 46.8 | |
| Resilience, percent | 68.5 | 45.7 | | | | 59.5 | | | 65.4 | | | | | 63.4 | 53.2 | |
| Abrasion (French Standard Specification NFT 46-012) cu. cm./HP/hour | 684 | 787 | | | | 839 | | | | | | | 1,565 | 667 | 664 | 879 |

For comparison natural rubber, filler by a typical optimum recipe with carbon black and with silic acid aerogel respectively, was vulcanised, using the following two mixes:

| | Mix I, parts | Mix II, parts |
|---|---|---|
| Natural rubber, smoked sheets | 100 | 100 |
| Stearic acid | 2 | 2 |
| Zinc oxide | 5 | 5 |
| "Vulcan 6" [1] | 47 | |
| "Hisil 233" [2] | | 54 |
| Pine tar | 3 | |
| Diethyleneglycol | | 2 |
| Sulfur | 2.5 | 2.5 |
| "Santocure" | 0.7 | 0.8 |
| Zinc diethyl dithiocarbamate | | 0.2 |

[1] "Vulcan 6" is the registered trademark of a carbon black marketed by Messrs. Cabot.
[2] "Hisil 233" is the registered trademark of a silica gel marketed by Messrs. Columbia Southern Chemical Corp.

The above mixes were vulcanised at the optimum temperature of 143° C. The test pieces revealed the following properties:

| | | |
|---|---|---|
| Vulcanisation time, minutes | 20 | 15 |
| Tensile strength, kg./cm.$^2$ | 510 | 233 |
| Modulus at 300% elongation, kg./cm.$^2$ | 112 | 57 |
| Ultimate elongation, percent | 575 | 650 |
| Shore hardness A | 63 | 74 |
| Tear strength, kg./cm | 147 | 129 |
| Rebound resilience, percent | 35 | 36 |
| Abrasion cu. cm./HP/hour | 273 | 836 |

EXAMPLE 2

Vulcanising styrene-butadiene rubber in the presence of an aminoplast

The following mix was prepared on a 2-roll mill:

Parts
Copolymer from 76.5% of butadiene and 23.5% of styrene _____ 100
Stearic acid _____ 2
Zinc oxide _____ 5
Aminoplast Q _____ 30
Diethyleneglycol _____ 2
"Circolight Process Oil" _____ 3
Sulfur _____ 2
"Santocure" _____ 1.2
Zinc diethyl dithiocarbamate _____ 0.5

EXAMPLE 3

Vulcanising chloroprene rubber in the presence of an aminoplast

The following rubber mix was prepared on a 2-roll mill:

Parts
"Neoprene W" [1] _____ 100
Stearic acid _____ 0.5
Zinc oxide _____ 5
"Maglite D" [2] _____ 4
Diethyleneglycol _____ 2
"Circolight Process Oil" _____ 3
Aminoplast L _____ 30
"Accelerator Na 22" [3] _____ 2

[1] "Neoprene W" is the registered trademark of a neoprene rubber marketed by Messrs. Du Pont de Nemours.
[2] "Maglite D" is the registered trademark of magnesium oxido marketed by Messrs. Merck.
[3] "Accelerator Na 22" is the registered trademark of a mercaptoimidazoline marketed by Messrs. Du Pont de Nemours.

To ensure optimum vulcanisation, the mix was vulcanised for 50 minutes at 150° C., whereupon the test pieces revealed the following properties:

Tensile strength—193 kg./cm.$^2$
Ultimate stretch—230%
Shore hardness A—80
Tear strength—50 kg./cm.
Rebound resilience—40%
Abrasion—585 cu. cm./H.P./hr.

EXAMPLE 4

Vulcanising nitrile rubber in the presence of an aminoplast

The following rubber mix was prepared on a 2-roll mill:

Parts
"Butacril BT 205" [1] _____ 100
Stearic acid _____ 1
Zinc oxide _____ 5
Aminoplast P and L respectively _____ 30
Diethyleneglycol _____ 2
"Circolight Process Oil" _____ 3
Sulfur _____ 1.3
"Santocure" _____ 1.1
Tetramethyl thiouram disulfide _____ 0.3

[1] "Butacril BT 205" is the registered trademark of a nitrile rubber marketed by Messrs. Ugine.

The resulting test pieces revealed the following properties:

|  | Aminoplast P | Aminoplast L |
|---|---|---|
| Tensile strength, kg./cm.² | 177 | 141 |
| Modulus at 300% elongation | 147 | 83 |
| Ultimate elongation, percent | 355 | 575 |
| Shore hardness A | 72 | 67 |
| Tear strength, kg./cm | 39 | 51 |
| Rebound resilience, percent | 25 | 28 |
| Abrasion, cu.cm./HP/hour | 292 | 485 |
| Optimum vulcanising time at 150° C., minutes | 20 | 25 |

We claim:
1. In a process for the manufacture of light-colored rubber vulcanizates, wherein a member selected from the class consisting of natural and synthetic rubber is vulcanized in the presence of particulate reinforcing agents, the improvement which consists in adding the reinforcing agent as an insoluble and infusible, finely dispersed amino-aldehyde resin having a specific surface area of more than 10 square meters per gram and an average particle size smaller than 5μ.

2. In a process for the manufacture of light-colored rubber vulcanizates, wherein a member selected from the class consisting of natural and synthetic rubber is vulcanized in the presence of particulate reinforcing agents, the improvement which consists in adding the reinforcing agent as an insoluble and infusible, finely dispersed amino-aldehyde resin having a specific surface area of more than 10 square meters per gram and an average particle size smaller than 5μ, said amino-aldehyde resin being selected from the group consisting of a melamine-formaldehyde resin and a urea-formaldehyde resin.

3. The improvement as claimed in claim 2, wherein finely dispersed amino-aldehyde resins are used that have been rendered insoluble in the presence of a surface-active substance.

4. The improvement as claimed in claim 2, wherein the amount of amino-aldehyde resin filler used makes up 1–80% of the weight of the vulcanizate as a whole.

References Cited

UNITED STATES PATENTS

| 3,003,990 | 10/1961 | Umland et al. | 260—38 |
| 3,238,156 | 3/1966 | Kohrn | 260—2.5 |

FOREIGN PATENTS

| 723,318 | 2/1955 | Great Britain | 260—3 |
| 824,252 | 11/1959 | Great Britain | 260—3 |
| 518,033 | 11/1955 | Canada | 260—3 |

OTHER REFERENCES

Winspear, George: "Rubber Handbook," The Vanderbilt Co., New York, N.Y., 1958, p. 338.

MURRAY TILLMAN, Primary Examiner

M. J. TULLY, Assistant Examiner

U.S. Cl. X.R.

260—826, 844, 845, 846, 851, 852, 854, 856